(12) United States Patent
Gartner et al.

(10) Patent No.: US 8,252,873 B1
(45) Date of Patent: *Aug. 28, 2012

(54) PROCESS FOR THE PRODUCTION OF A SUPERABSORBENT POLYMER

(75) Inventors: Herbert Gartner, Baden-Baden (DE); Jorg Harren, Baesweiler (DE); Marc Hager, Haguenau (FR); Harald Plochinger, Buhl (DE); Daniel Fricker, Roeschwoog (FR); Hans-Peter Kohler, Buhlertal (DE); Sabine Auernig, Lauf (DE)

(73) Assignee: Evonik Stockhausen GmbH, Krefeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,411

(22) Filed: Apr. 13, 2012

Related U.S. Application Data

(63) Continuation of application No. 12/942,633, filed on Nov. 9, 2010, now Pat. No. 8,198,385.

(60) Provisional application No. 61/319,287, filed on Mar. 31, 2010.

(30) Foreign Application Priority Data

Mar. 30, 2010 (EP) .................... 10003452

(51) Int. Cl.
- *C08F 2/00* (2006.01)
- *C08F 4/00* (2006.01)
- *C08F 4/72* (2006.01)
- *C08F 36/00* (2006.01)
- *C08F 210/00* (2006.01)

(52) U.S. Cl. ............ 526/65; 526/90; 526/108; 526/335; 526/348

(58) Field of Classification Search .................... 526/65, 526/90, 108, 335, 348
See application file for complete search history.

(56) References Cited

U.S. PATENT DOCUMENTS

| | | | |
|---|---|---|---|
| 4,076,663 | A | 2/1978 | Masuda et al. |
| 4,131,576 | A | 12/1978 | Iovine et al. |
| 4,179,367 | A | 12/1979 | Barthell et al. |
| 4,286,082 | A | 8/1981 | Tsubakimoto et al. |
| 4,340,706 | A | 7/1982 | Obayashi et al. |
| 4,466,983 | A | 8/1984 | Cifrese et al. |
| 4,587,308 | A | 5/1986 | Makita et al. |

(Continued)

FOREIGN PATENT DOCUMENTS

| | | |
|---|---|---|
| CA | 2460152 A1 | 3/2003 |

(Continued)

OTHER PUBLICATIONS

Ahmed et al., U.S. Appl. No. 11/778,372, filed Jul. 16, 2007, Final Office Action dated Jul. 23, 2010. Ahmed et al., U.S. Appl. No. 11/778,372, filed Jul. 16, 2007, Office Action dated Feb. 3, 2010.
Ahmed et al., U.S. Appl. No. 11/778,372, filed Jul. 16, 2007, Office Action dated Apr. 6, 2009.

(Continued)

*Primary Examiner* — William Cheung
(74) *Attorney, Agent, or Firm* — Smith Moore Leatherwood LLP; Philip P. McCann

(57) ABSTRACT

The present invention relates to superabsorbent polymer comprising the comprising the free radical polymerization product of an aqueous monomer mixture containing at least one α,β-ethylenically unsaturated monomer; at least one monomer having at least two α,β-ethylenically unsaturated groups; a crosslinking agent having at least two polymerizable double bonds; iron ions in an amount of from about 0.1 to about 3 wppm based on the total weight of the aqueous monomer mixture; and at least one chelating agent in an amount to provide a molar ratio of chelating agent to iron ion of from about 0.8 to about 4.0.

14 Claims, 1 Drawing Sheet

U.S. PATENT DOCUMENTS

| | | | |
|---|---|---|---|
| 4,659,793 | A | 4/1987 | Yang |
| 4,734,478 | A | 3/1988 | Tsubakimoto et al. |
| 4,857,610 | A | 8/1989 | Chmelir et al. |
| 4,863,989 | A | 9/1989 | Obayashi et al. |
| 4,893,999 | A | 1/1990 | Chmelir et al. |
| 5,180,804 | A | 1/1993 | Niessner et al. |
| 5,342,899 | A | 8/1994 | Graham et al. |
| 5,409,771 | A | 4/1995 | Dahmen et al. |
| 5,451,613 | A | 9/1995 | Smith et al. |
| 5,462,972 | A | 10/1995 | Smith et al. |
| 5,610,220 | A | 3/1997 | Klimmek et al. |
| 5,629,377 | A | 5/1997 | Burgert et al. |
| 5,672,633 | A | 9/1997 | Brehm et al. |
| 5,712,316 | A | 1/1998 | Dahmen et al. |
| 5,773,542 | A | 6/1998 | Koudate et al. |
| 6,060,557 | A | 5/2000 | Dahmen et al. |
| 6,211,400 | B1 | 4/2001 | Berghofer et al. |
| 6,313,231 | B1 | 11/2001 | Hosokawa et al. |
| 6,323,252 | B1 | 11/2001 | Gartner et al. |
| 6,335,398 | B1 | 1/2002 | Amiya et al. |
| 6,359,049 | B1 | 3/2002 | Carrico et al. |
| 6,403,700 | B1 | 6/2002 | Dahmen et al. |
| 6,448,320 | B1 * | 9/2002 | Igarashi et al. ............... 524/394 |
| 6,620,889 | B1 | 9/2003 | Mertens et al. |
| 6,710,141 | B1 | 3/2004 | Heide et al. |
| 6,727,345 | B2 | 4/2004 | Kajikawa et al. |
| 6,831,142 | B2 | 12/2004 | Mertens et al. |
| 6,835,783 | B1 | 12/2004 | Gartner et al. |
| 6,906,131 | B2 | 6/2005 | Ahmed et al. |
| 6,911,499 | B1 | 6/2005 | Brehm et al. |
| 6,916,864 | B2 | 7/2005 | Gartner et al. |
| 6,987,151 | B2 | 1/2006 | Gartner et al. |
| 7,163,969 | B2 | 1/2007 | Ahmed et al. |
| 7,169,843 | B2 | 1/2007 | Smith et al. |
| 7,173,086 | B2 | 2/2007 | Smith et al. |
| 7,179,862 | B2 | 2/2007 | Mertens et al. |
| 7,241,820 | B2 | 7/2007 | Smith et al. |
| 7,244,812 | B2 | 7/2007 | Muller et al. |
| 7,285,599 | B2 | 10/2007 | Mertens et al. |
| 7,291,674 | B2 | 11/2007 | Kang et al. |
| 7,312,286 | B2 | 12/2007 | Lang et al. |
| 7,335,713 | B2 | 2/2008 | Lang et al. |
| 7,399,813 | B2 | 7/2008 | Lang et al. |
| 7,427,650 | B2 | 9/2008 | Smith et al. |
| 7,482,058 | B2 | 1/2009 | Ahmed et al. |
| 7,488,541 | B2 | 2/2009 | Ahmed et al. |
| 7,504,551 | B2 | 3/2009 | Herfert et al. |
| 7,541,395 | B2 | 6/2009 | Reimann et al. |
| 7,579,402 | B2 | 8/2009 | Ahmed et al. |
| 7,625,957 | B2 | 12/2009 | Harren et al. |
| 7,777,093 | B2 | 8/2010 | Smith et al. |
| 7,795,345 | B2 | 9/2010 | Smith et al. |
| 7,833,624 | B2 | 11/2010 | Harren et al. |
| 2004/0186229 | A1 | 9/2004 | Heide et al. |
| 2006/0029782 | A1 | 2/2006 | Harren et al. |
| 2006/0074160 | A1 | 4/2006 | Handa et al. |
| 2006/0229369 | A1 | 10/2006 | Frank et al. |
| 2007/0066754 | A1 | 3/2007 | Loeker et al. |
| 2007/0129495 | A1 | 6/2007 | Mertens et al. |
| 2007/0135554 | A1 | 6/2007 | McIntosh et al. |
| 2007/0141338 | A1 | 6/2007 | Ishizaki et al. |
| 2007/0260357 | A1 | 11/2007 | Issberner et al. |
| 2008/0009616 | A1 | 1/2008 | Frank et al. |
| 2008/0214740 | A1 | 9/2008 | Harren et al. |
| 2008/0221277 | A1 | 9/2008 | Walden et al. |
| 2008/0234420 | A1 | 9/2008 | Smith et al. |
| 2008/0280128 | A1 | 11/2008 | Furno et al. |
| 2009/0023848 | A1 | 1/2009 | Ahmed et al. |
| 2009/0105389 | A1 | 4/2009 | Walden et al. |
| 2009/0134357 | A1 | 5/2009 | Bub et al. |
| 2009/0191408 | A1 | 7/2009 | Tian et al. |
| 2009/0202805 | A1 | 8/2009 | Furno et al. |
| 2009/0227741 | A1 | 9/2009 | Walden et al. |
| 2009/0234314 | A1 | 9/2009 | Nakamura et al. |
| 2010/0035757 | A1 | 2/2010 | Furno et al. |
| 2010/0036004 | A1 | 2/2010 | Harren et al. |
| 2010/0057027 | A1 | 3/2010 | Furno et al. |
| 2010/0075844 | A1 | 3/2010 | Loeker et al. |
| 2010/0099781 | A1 | 4/2010 | Tian et al. |
| 2010/0099799 | A1 | 4/2010 | Fricker et al. |
| 2010/0100066 | A1 | 4/2010 | Azad et al. |
| 2010/0105808 | A1 | 4/2010 | Fricker et al. |
| 2010/0105809 | A1 | 4/2010 | Fricker et al. |
| 2010/0130355 | A1 | 5/2010 | Tian et al. |
| 2010/0130950 | A1 | 5/2010 | Harren et al. |
| 2010/0209379 | A1 | 8/2010 | Furno et al. |
| 2010/0279860 | A1 | 11/2010 | Smith et al. |
| 2010/0286287 | A1 | 11/2010 | Walden |
| 2010/0311578 | A1 | 12/2010 | Smith et al. |
| 2011/0015601 | A1 | 1/2011 | Loeker et al. |
| 2011/0121231 | A1 | 5/2011 | Tian et al. |
| 2012/0001122 | A1 | 1/2012 | Wattebled et al. |

FOREIGN PATENT DOCUMENTS

| | | | |
|---|---|---|---|
| CN | 1761492 | | 4/2006 |
| CN | 02819951 | | 8/2007 |
| DE | 2706135 | A1 | 8/1978 |
| DE | 2840010 | A1 | 6/1979 |
| DE | 3503458 | A1 | 8/1985 |
| DE | 3544770 | A1 | 6/1987 |
| DE | 3713601 | A1 | 11/1988 |
| DE | 4020780 | C1 | 8/1991 |
| DE | 4244548 | A1 | 7/1994 |
| DE | 4418818 | A1 | 1/1995 |
| DE | 4333056 | A1 | 3/1995 |
| DE | 19529348 | A1 | 2/1997 |
| DE | 10249821 | A1 | 5/2004 |
| DE | 10334286 | A1 | 3/2005 |
| EP | 257951 | A2 | 3/1988 |
| EP | 0412363 | A2 | 2/1991 |
| EP | 0505163 | A1 | 9/1992 |
| EP | 1108745 | A1 | 6/2001 |
| EP | 1438354 | A1 | 7/2004 |
| EP | 2116571 | A1 | 11/2009 |
| EP | 2163302 | A1 | 3/2010 |
| EP | 2371869 | A1 | 10/2011 |
| WO | 9305080 | A1 | 3/1993 |
| WO | 9605234 | A1 | 2/1996 |
| WO | 9934843 | A1 | 7/1999 |
| WO | 0055245 | A1 | 9/2000 |
| WO | 0116197 | A1 | 3/2001 |
| WO | 0138402 | A1 | 5/2001 |
| WO | 02056812 | A2 | 7/2002 |
| WO | 03004237 | A2 | 1/2003 |
| WO | 03022896 | A1 | 3/2003 |
| WO | 03025054 | A1 | 3/2003 |
| WO | 2004003036 | A1 | 1/2004 |
| WO | 2004022609 | A1 | 3/2004 |
| WO | 2004037903 | A2 | 5/2004 |
| WO | 2004084962 | A1 | 10/2004 |
| WO | 2005054356 | A1 | 6/2005 |
| WO | 2006109882 | A1 | 10/2006 |
| WO | 2009011717 | A1 | 1/2009 |
| WO | 2011120746 | A1 | 10/2011 |

OTHER PUBLICATIONS

Ahmed et al., U.S. Appl. No. 12/884,713, filed Sep. 17, 2010, Office Action dated Aug. 26, 2011.
Ahmed et al., U.S. Appl. No. 12/884,713, filed Sep. 17, 2010, Office Action dated Jun. 24, 2011.
European Search Report completed on Aug. 16, 2010 in EP 10 00 3452.
International Search Report completed on Jul. 21, 2008 in PCT/US2007/089047.
International Search Report mailed on Feb. 10, 2009 in PCT/EP2008/065123.
International Search Report mailed on Mar. 24, 2011 in PCT/EP2011/052965.
Shi et al., U.S. Appl. No. 13/091,844, filed Apr. 21, 2011.
Written Opinion (German) mailed on Feb. 10, 2009 in PCT/EP2008/065123.
Written Opinion mailed on Aug. 7, 2008 in PCT/US2007/089047.
Written Opinion mailed on Mar. 24, 2011 in PCT/EP2011/052965.

* cited by examiner

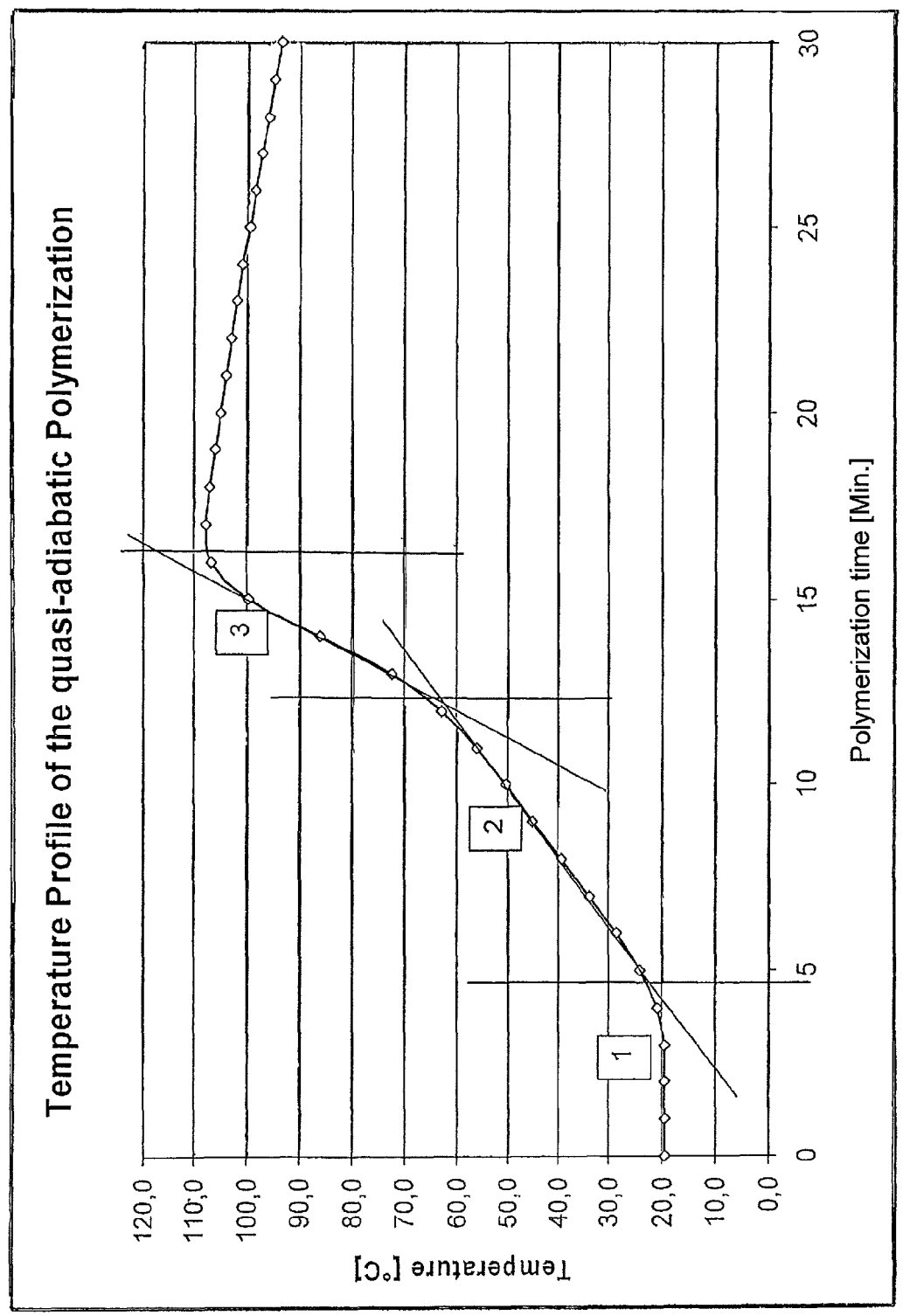

PROCESS FOR THE PRODUCTION OF A SUPERABSORBENT POLYMER

CROSS-REFERENCE OF RELATED APPLICATIONS

This application is a continuation application of U.S. application Ser. No. 12/942,633 filed on Nov. 9, 2010, now U.S. Pat. No. 8,198,385, which claims the benefit under 35U.S.C. 119(e) of U.S. Provisional Application No. 61/319,287 filed Mar. 31, 2010, and claims priority to European Application No. EP 10 003 452.9 filed Mar. 30, 2010, the disclosures of which are incorporated herein in their entirety by reference thereto.

The present invention relates to a process for the preparation of a superabsorbent polymer.

BACKGROUND OF THE INVENTION

The preparation of water absorbing polymers is, for example, summarized "Modern Superabsorbent Polymer Technology", F. L. Buchholz and A. T. Graham, Wiley-VCH, 1998, or in Ullmann's Encyclopedia of Industrial Chemistry, $6^{th}$ ed. vol. 35 pp 73-103. The preferred preparation process is the solution or gel polymerization. When using this technology usually a monomer mixture is prepared which is neutralized and then transferred into the polymerization reactor and is then discontinuously or continuously polymerized to form a polymer gel which is in case of a stirred polymerization comminuted. The polymer gel is subsequently dried, ground and sieved and optionally a surface treatment is applied.

Methods of continuous polymerization are, for example, described in WO-A-01/38402, WO-A-03/004237, WO-A-03/022896 and WO-A-01/16197.

For lab experiments, raw materials of high purity can be used, whereas in production there are limitations with respect to employing highly pure materials. For economical reasons, raw materials such as acrylic acid and caustic of technical grade are preferable employed. Also normal tap water or specifically provided, partially de-mineralized process water, which might be prepared from ground water or other available resources may be preferred over the more costly, fully de-ionized or distilled water.

On production scale it would, furthermore, be desirable to recycle to the monomer solution prior to polymerization scrubber water resulting from the purification of the vent streams of regular production plants and the portion of superabsorbent polymers, which is below specification in terms of particle size (fines). Technical grade raw materials as well as the scrubber water and the fines may contribute to the levels of impurities, which will finally be present in the monomer mixture and will possible disturb the polymerization reaction and may result in an inferior product quality.

Among the various impurities that might be present, heavy metal ions, particularly iron ions, play a significant, disturbing role. Iron is a known very active co-initiator is for redox systems and it has a significant impact on the product quality. U.S. Pat. No. 4,659,793 discloses a process for the preparation of aqueous solutions of copolymers of dicarboxylic acids with $\alpha,\beta$-ethylenically unsaturated acidic monomers such as (meth)acrylic acids, whereby in the reaction mixture 1 to 250 ppm of metal ions, particularly iron ions are present. The purpose of the presence of the iron ions is to reduce the content of residual unreacted dicarboxylic acids.

In controlled polymerization reactions for the manufacture of high performance SAP, iron ions are not desired as they may interfere with the initiator system thereby reducing the molecular weight, promoting undesired grafting etc. Iron ions are particularly not desired as their concentration cannot reliably be controlled under standard production conditions. Well designed initiator systems are employed, preferably comprising e.g. the redox couple sodium persulfate and/or hydrogen peroxide and ascorbic acid or other high performance initiator systems in concentrations, which on one hand result in high conversion of the monomer to the polymer and on the other hand allow a high molecular weight, crosslinked product being formed having homogeneous network and low fractions of low molecular weight polymer (extractables). Any additional uncontrolled co-initiator such as iron ions would disturb the precisely tailored system causing undesired effects.

The presence of iron ions causes increased initiation and polymerization rates as it increases the radical concentration. Consequently, the temperature of the reaction mass will rise faster thereby additionally raising the radical formation. Such undesired fast polymerization conditions result in polymers having lower average molecular weights, inferior molecular weight distributions and yet a higher fraction of low molecular weight polymer that will not be linked to the network (extractables). In general, an inferior, more inhomogeneous network is formed during such polymerization conditions, which is not preferable for the manufacture of a high performance superabsorbent polymer.

A further undesired effect of the spontaneous initiation and very high polymerization rate, which is promoted by the presence of iron ions is, that at the location where the co-initiator such as ascorbic acid or its salts, gets in contact with the monomer solution initiation and polymerization is so fast that the ascorbic acid gets trapped into the gel that is thereby formed. The reaction and gel formation is so fast that a homogeneous distribution of this co-initiator over the entire monomer solution is not possible. This inhomogeneous distribution consequently leads to inhomogeneous polymerization.

A further serious problem of such undesired conditions caused by the presence of iron ions in monomer solution is the risk that premature polymerization can occur in the process steps up-stream to the reactor, in particular after de-oxygenation, causing blockages in the preparation conveying system. This can lead to frequent plant shutdowns considerably reducing the commercial efficiency of the process.

WO 03/022896 teaches a continuous polymerization process, wherein the maximum temperature in the reactor is preferably controlled to be below 85° C. and in the initiation zone preferably between 40 to 85° C. In cases of too high initiation and polymerization rates the energy input by the polymerization reaction may be too high so that the temperature cannot be controlled within the preferred range. Too high temperature consequently will support, as has been discussed, a too high radical formation rate leading to even higher initiation and polymerization rates. It is believed that iron ions are the major contributor to such an uncontrollable radical formation rate and that the kinetics of polymerization can no more sufficiently be controlled.

WO 93/05080 suggests to use chelating agent like pentasodium salts of diethylen triamine pentaacetic acids in order to remove trace metals from the reaction mixture. Such chelating agents are used in amounts between about 100 and 2,000 ppm based on the $\alpha,\beta$-ethylenically unsaturated monomers. The lowest amount of chelating agent in the examples of WO 93/05080 is 171 ppm based on the monomer mixture. Similarly, WO 03/022896 uses in the examples chelating agents in an amount of about 280 ppm based on the total monomer mixture.

Another group of prior art references EP-A 257 951, U.S. Pat. No. 6,313,231, EP-A-1 108 745, U.S. Pat. No. 6,335,398 and US 2007/141338 deal with the problem of the effect of iron ions in the superabsorbent polymer which may result in combination with ascorbic acid originating from body fluids like urine or blood in a degradation of these superabsorbent polymer in a superabsorbent structure like a diaper. To counteract the effect of iron ions on the degradation of the already formed superabsorbent polymer, these reference suggest to add a chelating agent to a superabsorbent polymer.

But these references only deal with the effect of iron on the already formed superabsorbent polymer in a superabsorbent structure, but do not discuss the effect of iron on the polymerization process and the properties of the superabsorbent polymer.

In general, the prior art teaches the detrimental effect of iron ions either in the preparation of superabsorbent polymers or on the final superabsorbent polymer when coming into contact with body fluids. In any event, the only suggestion obtained from the prior art is that iron ions should be completely removed by considerably high amounts of chelating agents to avoid their detrimental effect.

When investigating the teaching of the prior art to use the chelating agent in the generally disclosed amounts in order to counteract the negative effects of iron ions that after the additional co-initiator an undesired delay of the start of the polymerization of several minutes and an undesired retardation of the polymerization rates was experienced resulting in less than optimal product properties of the resulting superabsorbent polymer. Thus, it is the object of the present invention to avoid the disadvantages of the teaching of the prior art as discovered by the present invention and provide a process for producing a superabsorbent polymer having improved properties.

SUMMARY OF THE INVENTION

This object has been attained by a continuous or batch process for the preparation of a superabsorbent polymer comprising:

a) subjecting an aqueous monomer mixture containing
- at least one $\alpha,\beta$-ethylenically unsaturated monomer;
- at least one monomer bearing at least two $\alpha,\beta$-ethylenically unsaturated groups;
- iron ions in an amount of from about 0.1 to about 3 wppm based on the total weight of the aqueous monomer mixture; and
- at least one chelating agent in an amount to provide a mol ratio of chelating agent to iron ion of from about 0.8 to about 4.0 to free radical polymerization in an reactor to obtain a super-absorbent polymer; and b) recovering the superabsorbent polymer, whereby if the process is continuous and is run in an agitated reactor the upper limit of the mol ratio of chelating agent to iron ion is about 4.0 for a throughput of total reaction mixture through the reactor of at most 1.3 kg/h per liter reactor volume, about 3.5 for a throughput of total reaction mixture through the reactor of more than 1.3 kg/h per liter reactor volume to 2.5 kg/h per liter reactor volume, and about 1.5 for a throughput of total reaction mixture through the reactor of more than 2.5 kg/h per liter reactor volume.

By performing the process according to the present invention the polymer gel formed in the reactor is non-sticky and possesses excellent flow behavior, the overall polymerization rate is in the preferred range for batch and particularly for continuous production and a final polymer of desired polymer can be obtained.

The present inventors have surprisingly discovered that the negative impact of iron on the one hand and the negative impact of the chelating agent on the other hand can be reduced or even eliminated if the concentrations of both are well balanced. Thus, contrary to the teaching in the prior art, it is important that iron ions are present in the reaction mixture subjected to radical polymerization and that the chelating agent is present in the narrow range of molar ratio of chelating agent to iron ion as defined above.

Furthermore, the present inventors have discovered that if the process is a continuous process run in an agitated reactor that the molar ratio of chelating agent to iron ions that is to be adjusted to solve the above-defined problem depends on the throughput through the reactor and is to be adjusted according to the conditions defined above.

Interestingly, when running the reaction either as a batch process or on a continuous belt reactor the molar ratio of chelating agent to iron ions may be within the broadest range as defined above.

According to one embodiment of the present invention the chelating agent is generally present in an amount to provided a molar ratio of chelating agent to iron ion of from about 0.9 to about 3.5, or from about 1.0 to about 3.5, or from about 1.0 to about 2.5 or from about 1.0 to about 2.0, or from about 1.0 to about 1.5. Of course, provided that when continuously running the process in an agitated reactor the above defined upper limit depending on the throughput are maintained.

In case the process of the present invention is continuously run in an agitated reactor the upper limit of the molar ratio of chelating agent to iron ion is about 3.5, preferably about 3.0 for a throughput of total reaction mixture through the reactor of is at most 1.3 kg/h per liter reactor volume, about 2.5, preferably about 2.0 for a throughput of total reaction mixture through the reactor of more than 1.3 kg/h per liter reactor volume to 2.5 kg/h per liter reactor volume, and about 1.3, preferably about 1.2 for a throughput of total reaction mixture through the reactor of more than 2.5 kg/h per liter reactor volume.

Furthermore, it is preferred to maintain the amount of iron ions in the aqueous monomer mixture from about 0.2 to about 2.5 wppm or from about 0.2 to about 1.5 wppm or from about 0.2 to about 1.0 wppm based on the total weight of the aqueous monomer mixture.

The product properties of the final superabsorbent polymer obtained by the process of the present invention that are improved is particularly the gel flowing ability (measured as gel flow index as will be described below), the ratio of CRC (Centrifuge Retention Capacity) to extractables and/or the product color.

Furthermore, adapting the concentration of iron ion and chelating agent within the limits of the present invention provides a valuable, efficient tool for controlling the kinetics of polymerization. By this measure premature polymerization up-stream of the polymerization reactor can be omitted and sufficient time can be provided to assure homogeneous mixing of the co-initiator with the monomer solution after its addition without leading to a too long delay of the start of the polymerization and retarded polymerization rates.

BRIEF DESCRIPTION OF THE DRAWING

The foregoing and other features, aspects and advantages of the present invention will become better understood with regard to the following description, claims, and the drawing where:

FIG. 1 is a graph showing the temperature profile of the polymerization.

DETAILED DESCRIPTION OF THE PRESENT INVENTION

Possible iron sources in a commercial production process for superabsorbent polymers are as discussed above. These residual iron contents in starting materials like caustic unsaturated monomers, polymer fines recycled to the monomer mixtures or scrubber water recycled to the monomer mixture. The scrubber water can be obtained from subjecting at least one off-gas stream withdrawn from any point of the process to scrubbing with a basic aqueous solution in a scrubber prior to venting. Such off-gas stream may contain carbon dioxide resulting in a carbonate and/or hydrogen carbonate containing scrubber solution. By recycling the scrubber solution also valuable products in the vent stream like polymer fines or monomer can be returned to the reaction mixture. Furthermore, since the scrubber water is generally basic and contains carbonate or hydrogen carbonate scrubber water can be used for neutralization of the monomer mixture and due to the formation of carbon dioxide in the neutralization reaction to support removal of oxygen from the monomer mixture prior to entry of the monomer mixture into the reactor.

Preferably, the oxygen concentration in the monomer mixture is reduced to a level of less than about 0.5 wppm or less than about 0.3 wppm or less than about 0.1 wppm based on the total weight of the monomer mixture.

Depending on which starting materials the monomer mixture according to the process of the present invention is prepared the iron content may differ. Thus, in accordance with the present invention the iron content of the monomer mixture to be used in the process is measured and, if necessary, the iron content is adjusted to be within the above-specified generally preferred range by adding preferably water soluble iron salts such as iron(III)sulfate hydrate in appropriate amounts.

According to one embodiment of the present invention the chelating agent is selected from organic polyacids, phosphoric polyacids and salts thereof. Preferably, the chelating agent is selected from, nitrilotriacetic acid, ethylene diamine tetraacetic acid, cyclohexane diamine tetraacetic acid, diethylene triamine pentaacetic acid, ethyleneglycol-bis-(aminoethylether)-N,N,N'-triacetic acid, N-(2-hydroxyethyl)-ethylene diamine-N,N,N'-triacetic acid, triethylene tetraamine hexaacetic acid, tartaric acid, citric acid, imino disuccinic acid, gluconic acid, and salts thereof.

The most preferred chelating agent is the pentasodium salt of diethylene triamine pentaacetic acid available in aqueous solution from The Dow Chemical Company under the trademark Versenex 80®.

According to one embodiment of the present invention the monomer mixture comprises at least one ethylenically unsaturated acid and at least one monomer bearing at least two ethylenically unsaturated groups that function as a covalent crosslinker. Suitable $\alpha,\beta$-ethylenically unsaturated acids include, for example, acrylic acid, methacrylic acid, crotonic acid, isocrotonic acid, itaconic acid and 2-acrylamido-2-methyl-1-propane sulfonic acid. These acids can be used in the acidic form, but it is more preferred to use the $\alpha,\beta$-ethylenically unsaturated acids in their at least partially neutralized form as alkali metal salts and ammonium salts.

The preferred unsaturated acids include acrylic acid and methacrylic acid in their respective salt forms, such as alkali metal or ammonium salts. Optionally minor amounts of other water-soluble unsaturated monomers, such as alkyl esters of the acid monomers including, for example, methylmethacrylate, methylacrylate, acrylamide or methacrylamide or (meth)acrylates of polyethyleneglycol methyl ether may be present in the monomer mixture. The monomers are employed in aqueous solution, preferably in amounts ranging from 10 wt % to 80 wt % based on the total weight of the aqueous monomer solution. Preferably the amount of monomer ranges from 15 wt % to 60 wt % based on the total weight of the aqueous monomer solution. In addition, certain grafting polymers such as, for example, polyvinyl alcohol, starch and water-soluble or -swellable cellulose ethers may be employed to is prepare the products. Such grafting polymers when employed are used in amounts of up to about 10 wt % based on the $\alpha,\beta$-ethylenically unsaturated monomer.

The water-absorbent polymer is preferably lightly covalently crosslinked to render it water-insoluble and water-swellable. The desired crosslinked structure can be obtained by including into the monomer mixture a crosslinking agent possessing at least two polymerizable double bonds in the molecular unit. The crosslinking agent is employed in an amount effective to covalently crosslink the water-soluble polymer. The preferred amount of crosslinking agent is determined by the desired degree of absorption capacity and the desired strength to retain the absorbed fluid that is the desired absorption against pressure (AAP) respectively the absorption under load (AUL). The crosslinking agent advantageously is used in amounts ranging from 0.0005 to 5 parts by weight per 100 parts by weight of the $\alpha,\beta$-ethylenically unsaturated monomer used. More preferably the amount ranges from 0.1 part by weight to 1 part by weight per 100 parts by weight of the $\alpha,\beta$-ethylenically unsaturated monomer. Usually if an amount of higher than about 5 parts by weight of crosslinking agent per 100 parts of monomer is used the polymers will have a crosslinking density that is too high and will exhibit reduced absorption capacity and increased AUL. If the crosslinking agent is used in amounts of less than 0.0005 parts by weight per 100 parts of monomer the polymer usually has a crosslinking density that is too low and when contacted with the fluid to be absorbed becomes sticky and exhibits a lower initial absorption rate.

While the covalent crosslinking agent preferably is soluble in the aqueous solution of the $\alpha,\beta$-ethylenically unsaturated monomer the crosslinking agent may be merely dispersed in such a solution. Examples of suitable dispersing agents include carboxymethyl cellulose suspending aids, methyl cellulose, hydroxypropyl cellulose and polyvinyl alcohol. Such dispersing agents are advantageously provided at a concentration between 0.0005 and 0.1 wt % based on the total weight of $\alpha,\beta$-ethylenically unsaturated monomer.

Suitable covalent crosslinking agents include compounds having in one molecule two to four groups selected from the group consisting of $CH_2=CHCO-$, $CH_2=C(CH_3)CO-$ and $CH_2=CH-CH_2-$. Exemplary covalent crosslinking agents include diallylamine; triallylamine; diacrylates and dimethacrylates of ethylene glycol, diethylene glycol, triethylene glycol, propylene glycol, 1,4-butanediol, 1,5-pentanediol, 1,6-hexanediol, neopentyl glycol, trimethylolpropane and pentaerythritol; triacrylates and trimethacrylates of trimethylolpropane and pentaerythritol; tetra-acrylate and tetramethacrylate of pentaerythritol; allyl methacrylate; and tetraallyloxyethane; and acrylates of the highly ethoxylated derivatives of trimethylolpropane or pentaerythritol having 3 to 30 ethylene oxide units, such as highly ethoxylated trimethylol propane triacrylate, tetra-acrylate and tetramethacrylate of pentaerythritol, and allyl methacrylate. Other suitable cross-linkers are monoallyl ether polyether monoacrylates such as polyethylene glycol monoallyl ether acrylate (PEG MAE/A). Mixtures of covalent crosslinking agents can be employed.

The polymerization may be carried out using acid monomers that are not neutralized or that have been fully or partially neutralized prior to the polymerization. Neutralization is conveniently achieved by contacting the aqueous monomer solution with an amount of base sufficient to neutralize between 10% and 95% of the acid groups present in the acid monomers. Preferably the amount of base will be sufficient to neutralize between about 40% and about 85%, and most preferably between about 55% and about 80% of the acid groups present in the acid monomers.

Suitable compounds that are useful to neutralize the acid groups of the monomers include those bases that will sufficiently neutralize the acid groups without having a detrimental effect on the polymerization process. Examples of such compounds include alkali metal hydroxides, alkali metal carbonates and hydrogen carbonates.

A conventional vinyl addition polymerization initiator may be used in the polymerization of the water-soluble monomers and the crosslinking agent. A free-radical polymerization initiator that is sufficiently soluble in the monomer solution to initiate polymerization is preferred. For example, water-soluble persulfates such as potassium persulfate, ammonium persulfate, sodium persulfate, and other alkali metal persulfates, hydrogen peroxide and water-soluble azo-compounds such as 2,2'-azobis-(2-amidinopropane)hydrochloride may be used. So-called redox initiator systems such as hydrogen peroxide or sodium persulfate which can be used as oxidizing component can be combined with reducing substances such as sulfites, amines or ascorbic acid. The amount of initiator used may range from about 0.01 wt % to about 1 wt %, preferably from about 0.01 wt % to about 0.5 wt % based on the total weight of the $\alpha,\beta$-ethylenically unsaturated monomer.

Furthermore, it is possible and even preferred, to recycle fines of superabsorbent polymers into the preparation process. As fines are considered those particles, which are too small for the desired application as defined by the product specification. This undesired product fraction is, therefore, removed from the granulated polymer. The fraction of fines can be determined by sieving using EDANA Standard Test Method WSP 220.2(5). Fines can also be generated by applying a fluidized bed for heating particulate superabsorbent polymers. By the hot air stream particles may be elutriated having a diameter of up to about 300 µm. Polymer particles having a particle size of less than about 300 µm, or less than about 200 µm are defined as fines in accordance with the present invention.

The fines may be recycled to any stage of the process according to the present invention but, as will be discussed in more detail below, it is particularly preferred to recycle the fines into the monomer mixture. Furthermore, other suitable additives may be added to the monomer mixture at a suitable point during the process, as will be discussed below. Other additives may be selected, for example, from alkali metal chlorate, polyethylene glycol, water insoluble organic or inorganic powder such as water insoluble metal oxides like silica or zinc oxide, surfactants, dispersing aids, agents to control odor like silver salts or other processing aids.

Without wanting to be limited, the present invention will now be discussed in more detail with respect to acrylic acid as most preferred ethylenically unsaturated acid for the preparation of superabsorbent polymers. But a person skilled in the art will appreciate that the same process may be conducted using different monomers or mixture of monomers.

The polymerization according to the present invention can be conducted in batch or continuous mode. Polymerization in dispersed phase is also possible.

Batch Operation

A batch polymerization is generally conducted in an agitated vessel. Kneader-type reactors capable of intimately mixing the reaction mass and of granulation the polymer gel which is formed in the cause of the polymerization are particularly preferred. Possible kneader reactors are e.g. such as described in U.S. Pat. No. 4,625,001, or reactors as provided from List AG (CH) (Type DTB, CRP, ORP, CKR etc.) For standard operations the aqueous monomer solution is prepared and filled into the reactor. The monomer solution may have a total monomer concentration preferably from 38 wt. % to about 45 wt. % and a temperature from about 10° C. to about 35° C., or from about 10° C. to about 30° C. The acrylic acid is neutralized in the range form about 40% to about 85%, or from about 68% to about 75%. The oxygen which is dissolved in the monomer solution is preferably removed to a concentration of below about 0.3 ppm. This can be achieved by either purging the solution with nitrogen for an appropriate time by adding a carbonate solution, for example scrubber water, as discussed above or a combination of both. The oxygen may also be chemically reduced by the addition of a reducing agent. Thereafter the initiators are added. First, the thermally decomposing and/or oxidizing initiators (Azo-initiators, peroxides or persulfates) and finally the co-initiators (the reducing component of the redox system) such as ascorbic acid is added. The co-initiator usually starts the polymerization reaction after some delay and the temperature of is the reaction mass begins rising by the exothermic reaction.

FIG. 1 depicts a typical temperature plot as obtained by batch polymerization in a non agitated 250-ml glass reactor without temperature control during polymerization. It represents a quasi adiabatic polymerization of a monomer solution having a monomer concentration of about 42% and a degree of neutralization of about 70%. The plot is divided in three segments: Segment 1 represents the delay of initiation (Delay) after mixing in the co-initiator, i.e. the span between the addition of the co-initiator and the start of the exothermic reaction indicated by a temperature increase by approximately 1° C. Segment 2 represents the substantially linear temperature increase up to conversion in the range from about 35 to about 75% and Segment 3 represents the segment in which the polymerization rate is increased and the conversion is completed. This increased reaction rate in segment 3 might be caused by the Norrish Trommsdorff Effect. The polymerization rates Rate 1 and Rate 2 are taken from the temperature increase within the segments 2 and 3. They are reported as the average temperature increase of the reaction mass in degree C. per minute.

Adiabatic polymerization experiments, such as in non-agitated reactors as described above allow convenient investigation of the polymerization kinetics as the temperature increase of the reaction mass is a sufficiently precise indication of the monomer conversion. By several experimental series the inventors have studied the impact on the iron and Versenex 80® concentration on the delay of initiation and on the polymerization rate.

Surprisingly, we have found that specific information obtainable by analysis of the adiabatic temperature raise, which is recorded during batch polymerization of a given monomer solution (exotherme), allow valuable predictions with respect to the polymerization behavior of that monomer solution in batch and continuous mode, the processibility of the gel obtained and to the properties of the final polymer. This tool can be used to assess and describe the optimal recipe requirements and is conditions for a monomer solution which shall be subjected to continuous polymerization. Monomer solutions according to the present invention and in combination with an optimal initiator system preferably provide a delay of initiation between about 10 seconds and about 2 minutes, or between about 20 seconds and about 100 seconds, a polymerization Rate 1 from 3 to 70° C./minute and a polymerization Rate 2 from about 50 to about 90° C./minute. Preferably Rate 2 is at least as high as Rate 1 or greater.

Continuous Operation

A continuous process according to the present invention is preferably performed in a reactor having at least three zones, whereby the first zone is an initiation zone, the second zone is a gel phase zone and the third zone is a granulation zone and the monomer mixture is fed to the initiation zone.

Continuous operation can be performed by preferably applying the kneader technology or the belt technology. As discussed above in accordance with the present invention the molar ratio of a chelating agent to iron ion in the aqueous monomer mixture is to be adjusted depending on the throughput of the reaction mass through the reactor if an agitated reactor system is used. The term "agitated reactor" is to be understood as to refer to reactors having means for agitating the reaction mass in addition to agitation caused by flow, for example turbulent flow of the reaction mass, in contrast to, for example, continuous belt reactors. Thus, in the following the continuous reaction will be discussed in more detail with respect to two types of reactors, i.e. agitated reactors and continuous belt reactors.

Continuous Polymerization in an Agitated Reactor

Preferred agitated reactors are continuous kneaders and continuous extruders.

The continuous polymerization in an agitated reactor will be described below with reference to kneader technology. A detailed description of such reactors may be is found in WO 03/022896. It is important for continuous polymerization that the initiation occurs regularly and reliably on a continuous basis and that the polymerization rates are in the desired ranges. The sufficiently de-oxygenated monomer solution as described above having a temperature in the range between about 10 and about 30° C. is continuously fed to the zone 1, the initiation zone of the reactor. In this zone intense back-mixing of the already formed hot gel and the cooler feed solution occurs. Depending on formulation and conditions of the monomer solution substantial conversion takes place in this zone which heats up the reaction mass in the zone. The temperature range of from about 60 to about 110° C., or from about 69 to about 105° C.) is desired in this zone.

If the temperature in this zone is below about 60° C. initiation in the reaction rate may become too slow so that the cool monomer feed would cool down the reaction mass further with the result that the overall polymerization rate would become too low for the desired residence time of the reaction mass in the reactor. Incompletely converted mass would be discharged from the reactor causing problems in downstream operations. The temperature in this zone could, however, be kept up by heating (jacket heating or steam injection, but this is not desirable for economical reasons.

If the temperature in the initiation zone raises above about 110° C. the initiation rate and the overall polymerization rate would become too fast, the obtained hydro gel would become sticky and difficult to be dried which can be measured as a drop of gel flow index and the product properties, in particular the ratio of centrifuge retention capacity to absorption against pressure would suffer.

The conversion in the initiation zone is expected to be in the range between about 35 to about 75%. Consequently, there is already a substantial amount of hydro gel present in this zone to which new monomer is continuously fed and mixed in by the kneader tools of the shafts. WO 03/022896 also teaches that there is a high degree of mixing achieved in the first zone and describes with reference to FIG. 1 in WO03/022896 the first zone as a "back mix segment" comprising two phases. The essential conditions are given in this zone to enable train transfer to polymer and grafting occurs leading to additional crosslinking and branching. Increasing delay of initiation will allow more intense back-mixing and monomer absorption of the present monomer and thereby increase the undesired effect of grafting. The temperature, particularly in the first zone is controlled by the appropriate formulation and preparation of the monomer solution. It is preferred to control the temperature of the feed solution within the desired range and to remove the dissolved oxygen to a concentration of below 0.3 ppm based on the total monomer solution. The monomer concentration and also the degree of neutralization is preferably controlled within the preferred ranges as defined above and the initiators should be added in the desired concentrations.

A further influence on the polymerization rate is coming from the fines which might be recycled to the monomer solution. Fines swell in the monomer solution, increase the viscosity of it and thereby activate the Norrish Trommsdorff Effect at an earlier stage of polymerization. Fines in the monomer solution accelerate the polymerization rate. It might be desirable to recycle all the fines which accumulate during the production of superabsorbent polymers. The ratio of recycling can be between about 1 and about 25% based on total weight of monomers and its effect should be considered in setting the concentrations of the applied initiators.

The Continuous Polymerization on a Belt Reactor

A detailed description of continuous polymerization on belt reactors is given in DE-A-35 44 770. The polymerization differs significantly from the polymerization in kneaders and extruders in a few aspects. The monomer solution is fed into the trough-like shape of the moving endless conveyor belt where it forms a kind of "lake" of monomer solution. Within some distance from the feed point, i.e. after some delay the polymerization starts and gel is visibly formed as the reaction mass is conveyed by the moving belt. Turbulences in the "lake" of this feed zone on the is belt only occur due to the flow of the feed stream but no other agitation is performed. Consequently, substantially no back-mixing between polymer gel and monomer solution takes place as the monomer solution converts from liquid into a continuous polymer gel strand that is continuously released during transition of the curved, trough-like shape of the conveyor belt into the extended flat form. Another difference to the kneader technology is that the initiation takes place at a lower temperature, i.e. temperature of the monomer feed stream. The reaction mass on the belt is not mixed, agitated or sheared and it is therefore granulated only after the gel is taken off the belt and the reaction is essentially completed. The gel-strand on the belt possesses a low gel surface as compared to the granulated gel in a kneader reactor and there are very limited possibilities to control the temperature from outside so it is even more important for the belt polymerization to control the kinetics of the polymerization reaction.

Workup of Superabsorbent Polymer Gel

Irrespective which reactor is used the gel is discharged from the last zone of the reactor which is located at the opposite end with respect to feed or initiation zone of the reactor. Using a kneader-type reactor the gel is wiped out of the reactor by the cleaning shaft over an adjustable weir through an opening in the housing at the side of the cleaning shaft.

It is preferable for smooth production conditions to have a buffer containment for polymer gel between the reactor and the next unit downstream of the process. In addition to maintaining a desirable quantity of buffer material the vessel also serves as a hold tank to allow further conversion of the polymer gel to a conversion of above 99%, even more preferred of above 99.5%. It furthermore provides an additional location where additives can be charged to the polymers and be mixed in. The design of that vessel is not critical as long as it provides tools for adequate agitation and for keeping up the desired temperature of the gel. Preferably the containment is insulated to keep the gel at the desired temperature, allows substantial plug flow and is designed such that the polymer gel can continuously and reliably be charged and discharged. The containment can be a vessel that is horizontally or vertically arranged, a single or multiple screw conveyor or a moving belt. The containment can serve multiple production line processes up- and downstream. In case several gel dryers are served with gel from one buffer vessel an adequate number of junctions are installed in order to properly divide the gel stream.

The resultant polymer is typically pre-sized and dried using means well known in the art. Suitable drying means include fluidized bed dryers, rotary dryers, forced air ovens, through-circulation vent dryers and belt dryers. In some instances drying will occur in two or more stages, i.e. multistage drying. Following the completion of drying the polymer is further sized to form particles, preferably having a weight average diameter of less then about 2 mm and more preferred less than about 1 mm. Preferably the final polymer product has a weight average particle size of at least about 300 µm.

After drying and sizing usually the superabsorbent polymer is classified, for example, by sieving in order to remove particles having a too low particle size which is not acceptable for the intended commercial use of the superabsorbent polymers.

These fines can be recycled to any point of the process of the present invention whereby it is a particular advantage of the process of the present invention when these fines can be recycled to the monomer mixture, as explained above.

Furthermore, it is desired that the dried particles may be heat treated or surface treated in order to improve the product properties, as is known in the prior art. For example, the dried particles may be heat treated in accordance with the procedures set forth in WO 93/05080 and/or U.S. Pat. No. 5,629,377. Such heat treatment is preferably carried out at a temperature of at least about 170° C., or of at least about 180° C., or of at least about 190° C. Such heat treatment is preferably carried out at a temperature of less than about 250° C., or less than about 240° C. The method of heat treatment is not critical. For example, forced air ovens, fluidized bed heaters, paddle driers and heated screw conveyors can be successfully employed. If desired, the heated polymer may be remoisturized for ease in handling. A way to improve absorptive properties of the polymer particles may be to surface-crosslink the polymer particles. Procedures for surface-crosslinking are well known in the art and described in, for example, U.S. Pat. No. 4,734,478 and U.S. Pat. No. 4,466,983. These procedures may increase the modulus and/or the absorbency under load of the polymer particles. Surface modification may be also achieved by incorporation of additives like aluminum salts or silica.

The agitated reactors may be operated under sub-atmospheric pressure and temperature control applies evaporation of water and condensates are generated in the process. The total volume of condensates generated by the polymerization reaction depends on the process conditions. These conditions determine the final energy balance and hence the part evaporation has in the temperature control system. The total amount of energy in the system is a balance of the energy streams which either add or remove energy from the system. Adding energy streams are the polymerization and the feed streams (depending on their temperature), heat transfer from the jacket into the reactor, dissipation of mixing energy and optionally steam injection. The energy removing streams are the energy of the gel discharged according to the given heat capacity of it and depending on the gel discharge temperature, heat transfer from the reactor to the jacket and shaft and energy consumed by evaporation. Under the above discussed preferred conditions the amount of water to be evaporated is in the range of about 8% to 18% based on the water present in the reaction mass. It can be removed from the reactor and separately be treated or it can be condensed and either be taken back to the gel in the reactor or to any of the downstream steps of the process until the gel is dried. It, alternatively, can be recycled to any of the suitable upstream steps of the process, preferably to the first zone of the reactor together with the reductive component of the redox initiator or to the unit for the preparation of the monomer solution.

For economical reasons it would on one hand be preferable to remove the evaporated fraction of water from the gel in order to maximize the solids content of the gel and hence not to generate the need of evaporation of the condensates. It has, however, be found that recycling of at least a part of the condensate to the gel reduces its stickiness and thus improves the flow behavior.

On the other hand it would be desirable to recycle the condensate to the monomer solution or the unit for its preparation, as far as it is not needed to improve the flow behavior of the gel. But before the present invention it was considered that due to possible impurities in the condensate recycling of the condensate to an upstream portion of the process may have a negative influence on process stability and product quality. Surprisingly, the inventors found that recycling the condensate, as described above, replacing the corresponding fraction of water of the recipe did not show any undesired impact if the molar rate of chelating agent to iron ions is adjusted in accordance with the present invention.

Experimental Part

Equipment 250 ml Glass Reactor

This reactor consists of a vertical glass vessel having an inner diameter of 6.3 cm and a lid with four openings with ground sockets. One opening of the lid may carry the electrode for oxygen measurement of be closed otherwise, the second opening is equipped with a gas one-way-valve to serve for gas release and the third opening carries a dip pipe (Pasteurpipette made of glass having a length of 23 mm; Supplier Brand D 79861 Wertheim) to be used for nitrogen purging and for the injection of further additives. The dip pipe is connected to the nitrogen supply with a silicon hose. Additives are injected by the aid of a syringe and hollow needle through the silicon hose into the pipette. There is inserted through the fourth opening a thermo couple (PTF 100) such that its tip measures the temperature in the center of the reaction mass.

Lab Kneader Reactor

The lab kneader reactor is a single screw kneader reactor of the type DTB 1.5 obtained by List AG Switzerland. The reactor is equipped with a jacket for heating and cooling, a vacuum system. A nitrogen supply system, a pipe inserted into the dome for additive addition (e.g. initiators) having a valve outside of the dome and a reactor control unit. All metal surfaces that are in contact with the monomer solution are passivated as needed by caustic and citric acid.

Modified List DTB 1.5 Reactor

The same lab reactor (List DTB 1.5) having a total reactor volume of 3.1 liter was also applied for continuous operation except that it was modified as follows:

The sight glass of the batch reactor which closes the horizontal housing on the opposite side of the drive were replaced by a fluorinated plastic coded (ChemResist) metal plate having on the upper area a 55 mm circular opening with a discharge tube to which a gel receptacle was fixed. This endplate allowed continuous discharge of the polymer gel and it functioned as a weir allowing a theoretical degree of filling of the reactor of about 60%.

For continuous feeding of the monomer solution was installed a transfer line for conveying the monomer solution form a storage container into the reactor through the pipe leading through the dome. This transfer line consisted essentially of a plastic hose which was in close distance to the reactor equipped with appropriate T-fittings for the continuous addition of the initiators and optionally of other additives, e.g. scrubber water, to the continuous monomer feed. The appropriate feeds of monomer solution and additives were accomplished by suitable peristaltic pumps. Integrated into the feed system up-stream to the T-junctions was also a 0.5 liter bubble column equipped with a dip pipe carrying on its lower end a glass frit for purging the monomer solution with a nitrogen stream for proper de-oxygenation.

Gel Drier

The Lab-Size Gel Drier

On lab scale, gel drying experiments are performed on a batch-operated Fluidized Bed Drier, type CTL (delivered by Allgaier-Werke KG, Ulmerstr. 75, D-7336 Uhingen). This drier is equipped with a conically shaped fluidization chamber having on the bottom side a Conidur fine-hole-plate of a diameter of 20 cm, a ventilator, an air heater, a fresh air filter and an exhaust air filter with automatic de-dusting and a control box. The air stream is flowing bottom-up and is not circulated. The fluidization chamber carries a basket possessing a bottom made of a metal screen. The gel to be dried is placed in this basket to form a gel bed having a thickness of about 5 cm and is dried by the hot air stream which is forced through the gel bed. This drier is capable of simulating the plant-scale belt drier.

Methods

Analytical Methods

CRC (Centrifuge Retention Capacity)
EDANA, STANDARD TEST: WSP 241.2 (05)
Gravimetric Determination of Fluid Retention Capacity in Saline Solution After Centrifugation
AAP (AUP) Absorption against Pressure (Adsorption Under pressure)
EDANA, STANDARD TEST: WSP 242.2 (05)
Gravimetric Determination of Absorption Under Pressure)
Extractables
EDANA, STANDARD TEST: WSP 270.2 (05)
Determination of Extractable Polymer Content by Potentiometric Titration
Res. AA (Residual Acrylic Acid)
EDANA, STANDARD TEST: WSP 210.2 (04)
Determination of the Amount of Residual Monomers in Superabsorbent Materials—Polyacrylate Superabsorbent Powers Oxygen in the Monomer Solution An electrochemical method is used for the determination of oxygen solved in the monomer solution.

Equipment and Material
   Microprocessor Oximeter Type Oxi 2000
     A membrane-covered electrochemical sensor having a gold cathode and a silver anode (WTW Trioxmatic 203)
   Calibration cell WTW PE/OXI OxiCal
   4-necked 250-ml glass vessel equipped with
   a magnetic stirring bar,
   a tight fitting for the sensor bar,
   a fitting for the nitrogen stream through the vessel,
   a fitting for the vent-gas stream and
   a fitting for charging the monomer solution.
   A magnetic stirrer
   A hose pump
   PE-hoses of suitable size and length Procedure The calibration of the sensor is carried out in air saturated with water vapor using the Calibration cell WTW PE/OXI OxiCal. It was performed exactly as described in is the user manual provided by WTW. To measure the oxygen concentration in the monomer solution the program was selected (PROG #6), which is suitable for the monomer solution and which was developed in cooperation with the supplier of the equipment.

Determination of the oxygen concentration in the monomer solution:

Prior to any measurement, the Microprocessor Oximeter is switched on and kept in the stand by mode for proper polarization for at least 30 minutes as recommended by WTW.

The monomer solution to be measured is placed in a 250 ml glass reactor, which is equipped with a suitable opening carrying the membrane-covered sensor and a magnetic bar and is placed over a magnetic stirrer.

The calibrated sensor is fixed to the glass reactor or to the glass vessel, respectively, with an angle of about 45° relative to the surface of the monomer solution and the stirrer is switched on and set to a speed to guarantee the needed approach flow to the sensor but to prevent the gas from the head-space of the vessel to form gas bubbles in the solution. After pressing the "PROG" button the oxygen concentration is measured and displayed in ppm (mg/l). The value is taken after it has stabilized, which may take some seconds.

In the presence of carbon dioxide, the buffering capability of the electrolyte solution is sufficient for short-term exposure; during long term exposure, however, carbon dioxide shifts the pH value into the acidic range and leads to increased values. For this reason, the sensor was entirely regenerated after each measurement according to the procedure given by WTW: The electrolyte solution of the sensor was exchanged, cathode and anode were cleaned and the membrane was exchanged for a new one.

Iron in the Monomer Solution

The iron test kit 'viscolor® ECO' delivered from Machery-Nagel (art. No. 931 026) has been used to determine the iron concentration in the monomer solution. The test is suitable to measure iron concentrations in the monomer solution from 0.04-1 mg/l (ppm). In case that the monomer solution contained more than 1 ppm, the solution was diluted accordingly by DI-water. Care was taken that the measurement was conducted before any chelating agent was added to the solution as this would have falsified the results.

Iron(III)sulfate hydrate (Riedel-de Haën, order number 31 235) was used for adjusting the desired iron concentrations in monomer solutions.

Gel-Flow-Index (GFI)

This method is used for the assessment of the flow behavior of superabsorbent gel as it is discharged from the reactor or the extruder. The flow characteristic is determined as the Gel Flow Index (GFI). It quantifies the flow of the gel granulate through a set of appropriate sieves, which are assembled to a sieve tower.

Equipment and Material
- Sieves having a diameter of 20 cm and mesh sizes of 25 mm, 20 mm, 16 mm, 10 mm and 8 mm
- A plastic tray (30 cm long, 25 cm wide, 5 cm high) to carry the sieve tower
- A 2-liter plastic bag
- A temperature-insulated box to take the sample in the bag during transport and short term storage and keep it at the desired temperature
- 500 ml plastic beaker
- Balance Procedure The sieves are stacked to form a sieve tower and placed in the plastic tray (see FIGURE below).

A gel sample taken from the source from which the sample needs to be analyzed is placed into the plastic bag, which is immediately put into the temperature-insulated box to be kept at the desired temperature until measured. From the sample in the plastic bag a portion of 200 g are carefully weighed into the plastic beaker and spread onto the top sieve of the sieve tower. Care must be taken not to touch or press the gel and not to allow any vibration to the sieves to not influence the natural, gravimetric flow behavior of the gel.

The gel sample is left for 2 minutes to flow through the sieves and thereafter, the portions of gel on the sieves are determined by weighing.

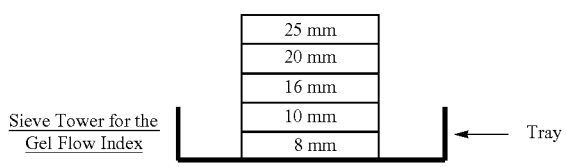

Calculation

The weights of the gel portions on the various sieves respectively in the tray are fed into the following formula to give the weighed mass on the sieve ($W_{i\ weighed}$)

$$W_{i\ weighed} = w_i * \alpha_i / w_{tot} * 100$$

where $w_i$ represents the weight of the gel on the sieve, $\alpha_i$ represents a sieve related weighting factor, where the factor is 0 for the 25-mm sieve, 0.2 for the 20 mm sieve, 0.4 for the 16-mm sieve, 0.6 for the 10-mm sieve, 0.8 for the 8-mm sieve and 1.0 for the gel weight in the tray and $w_{tot}$ represents the total gel weigh-in.

The Gel Flow Index is finally obtained by taking the sum of the weighted portions.

$$GFI = \Sigma W_{i\ weighed}$$

For accuracy, the procedure is repeated and the GFI reported represents the average of two measurements.

EXAMPLES

Lab Scale

Preparation of the Monomer Solution for Experiments on Lab Scale

For the preparation of the monomer solution, 34.64 parts of 99.9% active acrylic and 25.85 parts of 50% active NaOH (degree of neutralization=70%) were carefully mixed and cooled so that the temperature of the mixture was permanently kept below 35° C. To this mixture are added 30.69 parts of water, 0.09 parts of HE-TMPTA (2700 ppm b. o. AA), 0.35 parts of PEG 600 (6000 ppm b. o. AA). The iron concentration of the mixture is measured and optionally complemented as desired. Thereafter, portions of 5% active Versenex 80® (triamine pentaacetic acid sodium salt) are added to the desired concentration.

Polymerization in 250 ml Glass Reactor

A portion of 229.05 grams of the monomer solution filled into a 250 ml glass reactor which is placed in a water bath and the temperature of the solution is adjusted to 23±1° C. The nitrogen flow through the dip pipe is adjusted to 200 l/h to de-oxygenate the mixture for 5 minutes and is reduced to 50 l/h for further 3 minutes. Immediately after the reduction to 50 l/h are injected into the pipette 17.3 grams of a 10% aqueous solution of sodium carbonate which brings the final degree of neutralization to a level of 70% and the monomer concentration (AA and Na-AA) to 42%. A vigorous reaction starts immediately after the addition of the carbonate solution ($Na_2CO_3$) releasing $CO_2$ in form of very fine gas bubbles. At the end of the 3 minute period, the pipette is taken out of the solution to release the nitrogen to the head space of the reactor and to allow the fine $CO_2$ bubbles to separate from the solution. The oxygen concentration in the monomer solution has dropped to 0.1 ppm. Thereafter, the pipette is inserted in to the solution again, the nitrogen flow set to 200 l/h to provide intense mixing and then 0.58 gram of a 3% active solution of $H_2O_2$ (200 ppm b. o. AA) and 1.3 grams of a 10% active $Na_2S_2O_8$ (1500 ppm b. o. AA) are injected through the flexible hose into the nitrogen stream. 30 seconds later, the addition of 1.78 grams of a 0.9% active sodium ascorbate solution (185 ppm b. o. AA) finally initiates the polymerization which heats the reaction mass to peak temperature. Immediately after initiation the pipette is pulled up to the head space and the nitrogen stream reduced to 50 l/h to assure the inert atmosphere inside the reactor. The temperature of the reaction mass is recorded by the aid of a PT100 thermo couple. After having reached the peak temperature, the reactor was immersed into a water bath which was pre-heated to 70° C. and held there for one hour. Thereafter the lid of the reactor was removed and the gel block discharged from the reactor. In order to obtain sufficient gel for drying and further processing, two reactors are operated with identical monomer solutions and under identical conditions and the gel is combined.

Gel Sizing and Drying, Grinding and Sieving in the Lab

The gel blocks obtained form the polymerization in the 250 ml glass reactor are cut into pieces and then, while still having a temperature of above 60° C., extruded in a kitchen type meat mincer equipped with a die plate having openings of 8 mm. A portion of 400 grams of the extruded gel is then placed in the basket made of metal screen having a mesh size of 2 mm. The basket with the extruded gel is then placed in the lab-size drier and is being dried in the hot air stream of 5 m/sec and having a temperature of 180° C. for 20 minutes. The dry polymer obtained is ground in the roll mill and sieved in a Retsch sieve tower equipped with the sieves having mesh sizes of 850 and 150 microns obtaining the particle size fraction for analysis.

Examples 1-14

Monomer solution was prepared, polymerized and the polymer gel obtained further processed according to the methods described above. The iron concentration of the monomer solution was determined and complemented according to Table 1 below. Thereafter, portions of a 5% active, aqueous Versenex 80® solution (diethylene triamine pentaacetic acid sodium salt) were added to the solution as reported in Table 1. No fines were dispersed in the solution for recycling.

about 30° C. To de-oxygenate the solution, the pressure inside the reactor is reduced to below 100 mbar for two minutes to break the vacuum thereafter by nitrogen. This procedure is repeated twice. Now 87.19 g of a 10% active sodium carbonate solution are injected through the pipe at the dome and the monomer solution foams up. Vacuum to <100 mbar is pulled again and the agitator is stopped for about two minutes to allow the $CO_2$ bubbles to separate from the solution. After the agitator has been started again, the initiators are sucked in via the pipe: 2.91 g of a 3% active hydrogen peroxide solution and 6.54 g of a 10% active solution of sodium persulfate. After flushing the pipe with 20 ml of DI-water and mixing the monomer solution for two minutes, 11.52 g of a 0.7% active sodium ascorbate solution is added through the pipe. The

TABLE 1

Examples 1-14, Polymerization trials in the 250 ml glass reactor

| Example # | Fe3+ (ppm) | Mol ratio DTPA*5Na/Fe$^{3+}$ | CRC (g/g) | Extr. (%) | Ratio CRC/Extr. | Hunter Color L | Hunter Color b | Delay (sec) | Time to peak (sec) | Rate 1 (° C./min) | Rate 2 (° C./min) |
|---|---|---|---|---|---|---|---|---|---|---|---|
| 1* | 0.5 | 0.000 | 37.8 | 17.6 | 2.1 | 86.6 | 5.6 | 30 | 110 | 87.9 | 85.8 |
| 2 | 0.5 | 1.636 | 40.2 | 17.6 | 2.3 | 88.52 | 4.4 | 50 | 130 | 63.3 | 97.2 |
| 3* | 1 | 0.000 | 36.9 | 21.4 | 1.7 | 87.5 | 5.7 | 20 | 90 | 72.6 | 102.0 |
| 4 | 1 | 0.818 | 38.5 | 18.2 | 2.1 | 88.8 | 5.8 | 20 | 100 | 100.8 | 72.3 |
| 5 | 1 | 2.045 | 39.2 | 16.4 | 2.4 | 89.5 | 4.3 | 40 | 220 | 9.3 | 59.7 |
| 6* | 2 | 0.000 | 38.2 | 20.7 | 1.8 | 88.3 | 5.6 | 20 | 120 | 67.5 | 75.0 |
| 7* | 2 | 0.409 | 38.0 | 20.0 | 1.9 | 87.6 | 6.2 | 20 | 120 | 68.4 | 81.6 |
| 8 | 2 | 1.022 | 38.2 | 18.6 | 2.1 | 88.0 | 6.4 | 20 | 120 | 69.0 | 58.5 |
| 9 | 2 | 2.045 | 40.1 | 18.2 | 2.2 | 88.5 | 5.3 | 30 | 190 | 12.6 | 57.3 |
| 10* | 3 | 0.000 | 35.8 | 20.0 | 1.8 | 88.7 | 4.9 | 20 | 140 | 66.0 | 33.6 |
| 11* | 3 | 0.273 | 38.7 | 23.5 | 1.6 | 87.6 | 6.1 | 10 | 130 | 64.5 | 84.0 |
| 12* | 3 | 0.682 | 38.4 | 20.7 | 1.9 | 86.9 | 6.8 | 20 | 130 | 77.4 | 59.4 |
| 13 | 3 | 1.363 | 39.3 | 18.2 | 2.2 | 88.2 | 6.8 | 30 | 120 | 32.4 | 92.7 |
| 14 | 3 | 2.045 | 38.8 | 16.8 | 2.3 | 88.9 | 5.9 | 50 | 280 | 6.0 | 49.8 |

(*= comparative examples)

As is apparent from table 1 the examples according to the present invention show approved properties especially an improved ratio of CRC to extractables and improved color values.

Batch Polymerization in the List DTB 1.5 Reactor

The batch polymerization reactions for examples 15-22 were conducted in a single screw kneader reactor of the type DTB 1.5 obtained by List AG Switzerland.

A portion of 1194.8 g monomer solution prepared as described above is filled into the reactor through the dome and thereafter the dome is closed by fixing the lid on top of it. The agitator of the reactor is switched on and the temperature of the reactor and of the monomer solution in it is adjusted to pressure in the reactor is now set o normal pressure by nitrogen to assure the inert atmosphere inside the reactor. After a delay as reported in Table 2, the temperature of the reaction mass rose and the temperature of the jacket is adjusted such that it essentially follows the temperature of the reaction mass. When the reaction mass reaches the temperature of 50° C., the temperature of the jacket is set to 70° C. to finally hold the polymer gel in the reactor at this temperature for 30 minutes. Thereafter, the endplate of the reactor is removed to discharge free flowing gel granulate from the reactor. The obtained polymer is further processed as described above. The Examples 15-24 were performed by this procedure and the results are summarized in Table 2.

TABLE 2

Examples 15-24, Polymerization trials in the List 1.5 DTB reactor

| Example # | Fe3+ (ppm) | Mol ratio DTPA*5Na/Fe$^{3+}$ | CRC (g/g) | Extr. (%) | Raio CRC/Extr. | Delay (sec) | Rate 1 (° C./min) |
|---|---|---|---|---|---|---|---|
| 15* | 0.5 | 0.000 | 36.7 | 16.3 | 2.3 | 120 | 7.2 |
| 16 | 0.5 | 1.636 | 37.2 | 14.7 | 2.5 | 160 | 7.1 |
| 17 | 0.5 | 2.454 | 39.1 | 16.5 | 2.4 | 80 | 6.4 |
| 18* | 0.5 | 8.179 | 36.8 | 13.7 | 2.7 | 410 | 2.5 |
| 19* | 0.5 | 18.403 | 31.0 | 12.4 | 2.5 | 500 | 2.1 |
| 20* | 2 | 0.000 | 41.9 | 19.4 | 2.2 | 30 | 11.2 |
| 21 | 2 | 1.022 | 43.5 | 17.3 | 2.5 | 70 | 12.2 |
| 22 | 2 | 2.044 | 43.1 | 14.7 | 2.9 | 140 | 5.5 |
| 23* | 3 | 0.000 | 40.6 | 23.2 | 1.8 | 30 | 7.2 |
| 24 | 3 | 1.363 | 41.8 | 17.6 | 2.4 | 50 | 10.2 |

(*= comparative examples)

As is apparent form table 2 the examples according to the invention show compared to the comparative examples improved product properties especially CRC and ratio of CRC to extractables.

Continuous Polymerization in the Modified List DTB 1.5 Reactor

Examples 25-1 to 25-2

The monomer solution was prepared as describe above and the iron content of the solution was set to 0.5 ppm (b. o. solution). It contained chelating agent as indicated in Table 3 below and its temperature was adjusted to and maintained at 22° C. The initiator solutions were prepared and de-oxygenated in separate containers from which they were accordingly fed through the T-fittings to the monomer feed.

The atmosphere of the head space of the modified reactor was kept inert by a continuous nitrogen stream through it of 200 l/h and the temperature of the jacket of the reactor was set to 90° C. Into this reactor were continuously fed monomer solution having a temperature of 22° C. at a ratio of 4.0 kg/h (1.29 kg/liter total reactor volume) which was de-oxygenated in the bubble column with a nitrogen stream of 20 l/h, a 35 active aqueous solution of hydrogen peroxide (400 ppm b. o. AA), a 10% active aqueous solution of sodium persulfate (1800 ppm b. o. AA), 20% of scrubber water (b. o. AA) containing 10% of sodium carbonate and 2% of NaOH and an 0.7% active aqueous solution of sodium erythorbate (200 ppm b. o. AA). The carbonate of the scrubber water completed perfect de-oxygenation and the sodium ascarbonate finally triggered immediate initiation of the polymerization reaction.

At steady state conditions, the monomer feed is at least partially mixed with the polymer gel that is present in the reactor (on average about 1.7 kg) and polymer gel is continuously discharged through the opening and the discharge tube of the end plate into the gel receptacle. The discharged gel was kept under nitrogen for additional 60 minutes and thereafter it was further processed as described above. Comparative Example 25-2 could be terminated, however, the gel became stickier and the reactor fouling became visible, mainly where the dome is flanged to the housing. Gel lumps building up in that area threatened to block the dome and had to be removed manually. This effect is recognizable as an increase of the torque value of the shaft.

Examples 26-1 to 26-3

The following examples were performed as the examples 25, except that the throughput was set to 7.75 kg/h and the Versenex 80® concentrations were adjusted according to table 3. The results are summarized in that table. Example 26-1 failed because the monomer solution became too reactive and the gel was too sticky. Example 26-3 failed because the too high Versenex 80® concentration retarded the polymerization reaction in a range that no sufficient conversion of the monomer occurred inside of the reactor, the reaction mass became sticky. As a consequence in both cases, fouling of the shaft and the housing occurred and the reactor overfilled so that the experiment had to be stopped without reaching steady state conditions.

Examples 27-1 to 27-3

The following examples were performed as the examples 25 except that the throughput was set to 9 kg/h and that the Versenex 80® concentrations were adjusted according to table 3. The results are summarized in that table. Example 27-1 failed because the monomer solution became too reactive. Example 27-3 failed because the too high Versenex 80® concentration retarded the polymerization reaction in a range that no sufficient conversion of the monomer occurred inside of the reactor, the reaction mass became sticky. As a consequence in both cases, fouling of the shaft and the housing occurred and the reactor overfilled so that the experiment had to be stopped without reaching steady state conditions. This effect is recognizable for the torque value from the acquisition unit.

Examples 28-1 and 28-2

The following examples were performed as the examples 27 except that the concentration of the iron ions in the monomer solution was set to 1 ppm and that the Versenex 80® concentrations were adjusted according to table 3. The results are summarized in that table. Example 28-2 failed because the too high Versenex 80® concentration retarded the polymerization reaction too much so that no sufficient conversion of the monomer occurred inside of the reactor. As a consequence, the reaction mass became sticky, fouling of the shaft and the housing occurred, the reactor overfilled so that the experiment had to be stopped without reaching steady state conditions.

TABLE 3

Examples 26-29 (Continuous polymerization in the modified List DTB 1.5 reactor

| Example # | Fe3+ (ppm) | Mol ratio DTPA*5Na/Fe$^{3+}$ | CRC (g/g) | Extr. (%) | Res. Mon. (ppm) | Hunter Color L | Hunter Color b | GFI (%) |
|---|---|---|---|---|---|---|---|---|
| 25 | Throughput 4 kg/h (1.29 kg/h and per liter of total reactor volume) | | | | | | | |
| 25-1 | 0.5 | 3.806 | 37.2 | 20.7 | 478 | 90.6 | 6.7 | 23.5 |
| 25-2* | 0.5 | 8.172 | 34.7 | 14.7 | 2212 | 88.9 | 5.1 | 16.7 |
| 26 | Throughput 7.5 kg/h (2.42 kg/h and per liter of total reactor volume) | | | | | | | |
| 26-1* | 0.5 | — | 35.7 | 24.3 | 480 | 87 | 7.7 | 6.4 |
| 26-2 | 0.5 | 1.226 | 38.9 | 21.2 | 676 | 91.3 | 6.9 | 23.5 |
| 26-3* | 0.5 | 4.086 | 33.9 | 16.5 | 670 | 90.6 | 6.6 | 31.7 |
| 27 | Throughput 9 kg/h (2.9 kg/h and per liter of total reactor volume) | | | | | | | |
| 27-1* | 0.5 | — | 36.6 | 19.7 | 596 | 89.6 | 7.1 | 11.4 |
| 27-2 | 0.5 | 1.0 | 38.4 | 20.3 | 430 | 90.4 | 7.4 | 13.4 |
| 27-3* | 0.5 | 1.634 | 33.5 | 16.1 | 880 | 89.8 | 6.5 | 25.5 |
| 28 | Throughput 9 kg/h (2.9 kg/h and per liter of total reactor volume) | | | | | | | |
| 28-1 | 1.0 | 1.0 | 38.9 | 22.9 | 401 | 89.9 | 6.4 | 20.5 |
| 28-2* | 1.0 | 1.634 | 27.6 | 10.2 | 1491 | 89.1 | 7.3 | 41.4 |

(*= comparative examples)

Continuous Polymerization in the List ORP 4000 Reactor

Examples 29

Plant Trials on P24

Example 29-1

The monomer solution was continuously produced by feeding to the preparation unit of the monomer solution 3140 kg/h of acrylic acid (active content 99.7%), 4645.7 kg/h of a 24% active sodium hydroxide solution to neutralize the acrylic acid to a degree of 67%, 1108 kg/h of DI-water and of 5% active solution of DTPA*5Na (Versenex 80®) to obtain a monomer solution having a concentration of iron ions of 0.3 ppm (b. o. total solution) and a molar ratio of DTPA*5Na/$Fe^{3+}$ of 0.99. This monomer solution having a temperature of 22° C. and a total solids concentration of 39.5% was continuously transferred to the two screw reactors (List ORP 4000) at a feed rate of 9800 kg/h. To this mixture was added by injecting to the transfer line 5.98 kg/h of HE-TMPTA (SR9035, active content as delivered from Cray Valley France, 1910 ppm b. o. AA), 28.7 kg/h of a 60% active solution of PEG 600 (6000 ppm b. o. AA) and 335 kg/h of a 14% active solution of sodium sulfate (1.5% b. o. AA). Into the feed stream were also continuously injected 407 kg/h of SAP fines via a disperser (13% b. o. AA), 41.7 kg/h of a 3% active hydrogen peroxide solution ppm b. o. AA), 56.34 kg/h of a 10% active sodium persulfate solution (1800 ppm b. o. AA) and 470 kg/h of scrubber water containing 10% of sodium carbonate and 2.9% NaOH together with a stream of about 13.5 kg/h of nitrogen. To the feed zone of the reactor was also continuously fed 98.4 kg/h of a 0.7% aqueous sodium erythorbate solution (220 ppm b. o. AA). Furthermore were injected through a bottom valve of the reactor into the reaction mass 70 kg/h of stream of 133° C. (2 bar). Including all the components the reactor was operated at a throughput of reaction mass of 10407 kg/h (2.42 kg/h and per liter of total reactor volume) having a total solids content of 41%.

Jacket and shaft zone 1 of the reactor were heated by steam of 140° C. (2.9 bar) in order to keep up the temperature of zone 1 at between 95° C. and 102° C. as recorded by a thermo couple which was mounted in a boring through jacket and housing such that the tip of it was in contact with the reaction mass. Zone 3 of the reactor was cooled by cooling water. The shafts of the zones 2 and 3 and the jacket of zone 3 were cooled by cooling water having a temperature of 18° C.

The polymerization occurred in the reactor at an absolute pressure of about 940 mbar and under these set conditions the temperature of zone 1 was recorded being 101° C. (most likely influenced by the hot jacket), zone 2 being 90.2 and zone 3 being 92.4° C. The evaporated water was condensed in the condenser above the reactor and refluxed onto the gel in zone 3 of the reactor. The free flowing granulated gel was continuously discharged from the reactor into the hold tank where it resided for about one hour at a temperature of 89.5° C., then fed to the extruder at a temperature of 88.5° C. to be minced through a die plate having 13 mm wide slits which were radially arranged and dried on a belt drier in an air stream having 145° C. for about 20 minutes. After drying the polymer was ground in a roll mill and sieved to obtain a particulate polymer having a particle size between 150 and 850 mm. Quality data of the product obtained are displayed in table 4.

Example 29-2

Example 29-1 was repeated except that the Versenex 80® concentration was adjusted to provide a molar ratio of DTPA*5Na($Fe^{3+}$) of 1.86 that the steam injection to the reaction mass was automatically increased to about 110 kg/h. The temperature of zone 1 could essentially be maintained at the desired temperature range.

Example 29-3

Example 29-1 was repeated except that the Versenex 80® concentration was adjusted to provide a molar ratio of DTPA*5Na($Fe^{3+}$) of 3.71 and that steam injection and jacket and shaft heating was tapped to its full potential. Nevertheless, the temperature of zone 1 dropped below a critical temperature followed by a progressive shift of the polymerization reaction toward the discharge end and finally, without coming to steady state conditions, the experiment had to be stopped to prevent process problems downstream.

TABLE 4

Examples 29 (Continuous polymerization in the List ORP 4000 reactor

| Example # | Fe3+ (ppm) | Mol ratio DTPA*5Na/$Fe^{3+}$ | CRC (g/g) | Extr. (%) | Res. Mon. (ppm). | Hunter Color L | B |
|---|---|---|---|---|---|---|---|
| 29-1 | 0.3 | 0.99 | 39.1 | 19.4 | 485 | 93.1 | 6.1 |
| 29-2 | 0.3 | 1.86 | 39.7 | 18.9 | 492 | 94.1 | 5.6 |
| 29-3* | 0.3 | 3.71 | Failed by insufficient reactivity of the monomer solution | | | | |

(*= comparative examples)

Continuous Polymerization of the Moving Belt

Plant-scale produced monomer solution containing 33.2% acrylic acid which is neutralized with caustic to a degree of neutralization of 70% and having a temperature of 20° C. was provided in a storage vessel and de-oxygenated by pouring nitrogen through it. To this solution were added 2700 ppm b. o. AA of HE-TMPTA and 6000 ppm b. o. AA of PEG and the iron concentration in the solution was adjusted to be 0.5 ppm b. o. the solution. From this vessel it was continuously charged through a transfer line at a rate of 350 kg/h to the moving belt of the reactor which moved at a speed of 0.33 m/min resulting in a residence time of the reaction mass on the belt of 45 minutes. To this transfer line were added within the appropriate feed rates to achieve the desired concentrations (b. o. AA) hydrogen peroxide (200 ppm), sodium persulfate (1500 ppm) and an 10% active sodium carbonate solution (20%). An in-line mixer assured sufficient homogenization of the components. The sodium ascorbate solution, 150 ppm b. o. AA, was sprayed to the monomer feed as it run onto the belt. The $CO_2$ resulting from the carbonate separated from the solution and thereby generating a foam which substantially covered the "monomer lake" which extended about 20 cm along the moving belt. The reaction mass polymerized and its temperature rose to about 110° C. as it moved away from the feed point. The gel strand was continuously discharged at the end of the belt, but into chunks, extruded through a 13 mm die plate and continuously spread onto the drier belt by a distribution belt. The gel was dried in the belt drier in a hot-air stream at 160° C. for 40 minutes. The dry polymer was ground and sieved.

This recipe and technology was applied to conduct the four experiments according to Table 5. The results are summarized in table 5.

TABLE 5

Examples 30-33 Polymerization trials on a moving belt

| Example # | GFI (%) | Mol ratio DTPA*5Na/$Fe^{3+}$ | CRC (g/g) | Extr. (%) | Moisture (%) | Hunter Color L | Hunter Color B |
|---|---|---|---|---|---|---|---|
| 31 | 30.2 | — | 35.4 | 13.3 | 5.8 | 93.3 | 4.2 |
| 32 | 56.5 | 0.818 | 35.8 | 9.5 | 6.1 | 94.6 | 4.3 |
| 33 | | 4.090 | Polymerization failed due to insufficient initiation | | | | |

What is claimed:

1. A superabsorbent polymer comprising the free radical polymerization product of an aqueous monomer mixture containing
   at least one α,β-ethylenically unsaturated monomer comprises acrylic acid that is at least partially neutralized and polymerizable into a water-soluble polymer;
   at least one monomer having at least two α,β-ethylenically unsaturated groups;
   from about 0.0005 to 5 parts by weight per 100 parts of the α,β-ethylenically unsaturated monomer of a crosslinking agent having at least two polymerizable double bonds in the molecular unit to covalently crosslink the resulting water-soluble polymer;
   iron ions in an amount of from about 0.1 to about 3 wppm based on the total weight of the aqueous monomer mixture; and
   at least one chelating agent in an amount to provide a molar ratio of chelating agent to iron ion of from about 0.8 to about 4.0.

2. The superabsorbent polymer according to claim 1 whereby the chelating agent is present in an amount to provide a molar ratio of chelating agent to iron ion of from about 0.9 to about 3.5.

3. The superabsorbent polymer according to claim 1 whereby the chelating agent is present in an amount to provide a molar ratio of chelating agent to iron ion of from about 1.0 to about 2.5.

4. The superabsorbent polymer according to claim 1 whereby the iron ions are present in the aqueous monomer mixture in an amount of about 0.2 to about 2.5 wppm based on the total weight of the aqueous monomer mixture.

5. The superabsorbent polymer according to claim 1 whereby the chelating agent is selected from organic polyacids, phosphoric polyacids and salts thereof.

6. The superabsorbent polymer according to claim 1 whereby the chelating agent is selected from nitrilotriacetic acid, ethylene diamine tetraacetic acid, cyclohexane diamine tetraacetic acid, diethylene triamine pentaacetic acid, ethyleneglycol-bis-(aminoethylether)-N,N,N'-triacetic acid, N-(2-hydroxyethyl)-ethylene diamine-N,N,N'-triacetic acid, triethylene tetraamine hexaacetic acid, tartaric acid, citric acid, imino disuccinic acid, gluconic acid, and salts thereof.

7. The superabsorbent polymer according to claim 1 whereby the chelating agent comprises diethylene triamine pentaacetic acid sodium salt.

8. The superabsorbent polymer according to claim 1 whereby the iron ions are present in the aqueous monomer mixture in an amount of about 0.2 to 1.5 wppm based on the total weight of the aqueous monomer mixture.

9. The superabsorbent polymer according to claim 1 whereby the oxygen concentration in the monomer mixture is reduced to a level of less than 0.5 wppm based on the total weight of the monomer mixture.

10. The superabsorbent polymer according to claim 1 wherein the monomer mixture comprises from about 0.1 wppm to about 0.5 wppm of an oxygen concentration.

11. The superabsorbent polymer according to claim 1 wherein the superabsorbent polymer is a particulate superabsorbent polymer having a weight average particle size of at least about 300 μm.

12. The superabsorbent polymer according to claim 11 wherein the particulate superabsorbent polymer has a Centrifuge Retention Capacity of from about 25 to about 45 g/g according to the test.

13. The superabsorbent polymer according to claim 11 wherein the particulate superabsorbent polymer is surface treated with a surface crosslinking agent.

14. The superabsorbent polymer according to claim 11 wherein the particulate superabsorbent polymer is surface treated with an additive selected from aluminum salts or silica.

* * * * *